United States Patent [19]

Blok

[11] 3,961,702
[45] June 8, 1976

[54] MOUNTING MEANS FOR CONVEYOR FLIGHT
[75] Inventor: Glen R. Blok, Milwaukee, Wis.
[73] Assignee: Pratt Manufacturing Corporation, Milwaukee, Wis.
[22] Filed: Jan. 20, 1975
[21] Appl. No.: 542,146

[52] U.S. Cl. .............................. 198/175; 74/245 C
[51] Int. Cl.[2] .................. B65G 19/00; F16G 13/02
[58] Field of Search ........... 198/175, 176, 171, 172; 74/245 C, 251 C

[56] References Cited
UNITED STATES PATENTS

| | | | |
|---|---|---|---|
| 2,443,010 | 6/1948 | Petskeyes | 198/175 |
| 2,575,610 | 11/1951 | Ball | 198/175 |
| 2,756,868 | 7/1956 | Russell | 198/176 |
| 2,756,869 | 7/1956 | Merck et al. | 198/176 |
| 2,761,548 | 9/1956 | Long | 198/176 |
| 2,865,492 | 12/1958 | Bigler et al. | 198/176 |
| 3,103,275 | 9/1963 | Rollins | 198/171 |

Primary Examiner—Samuel Scott
Assistant Examiner—A. Russell Burke
Attorney, Agent, or Firm—Arthur L. Morsell, Jr.

[57] ABSTRACT

A conveyor flight is connected to a roller link conveyor chain by a pair of spaced pins which project transversely from the chain. The pins are removably supported in transverse sleeves of the chain and have end portions which are removably received in spaced parallel bores in the end of the flight, with grooved portions which project into opposite sides of a transverse opening in the flight. A latch member on the flight has a portion projecting into the transverse opening, and said latch portion is dimensioned to releasably engage the exposed grooves in both pins to releasably latch the flight to the pins. The opposite sides of the latch portion are notched adjacent to the grooves in the pins, and the notched portions are positioned to be moved into alignment with the pins, when the latch member is manually depressed, to release the pins so that the flight can be quickly detached.

9 Claims, 7 Drawing Figures

MOUNTING MEANS FOR CONVEYOR FLIGHT

BACKGROUND OF THE INVENTION

This invention relates to a mounting means including a quick-disconnect latch for releasably connecting a flight bar to any desired position on a roller link conveyor chain. In the past, pairs of spaced apart connecting pins have been used to connect flights to a roller link conveyor chain, the pins extending into spaced parallel bores in the end of the flight. The bores in the flight were slightly smaller in diameter than the connecting pins to provide a press fit therewith, and were spaced apart by a slightly greater distance than the connecting pins to help hold the flights in place on the pins. However, it was sometimes necessary to move the flights from their original location on the conveyor chain to a different location, and this was difficult due to the press fit. Moreover, after several shifts, the diameter of the bores in the flights became enlarged and would no longer provide the press fit that was required to secure the flights to the conveyor chain.

SUMMARY OF THE INVENTION

In accordance with this invention, the foregoing problems have been solved by providing a convenient quick-disconnect latch for removably connecting the flights to their respective connecting pins.

DESCRIPTION OF THE PREFERRED EMBODIMENT

Figure 1:
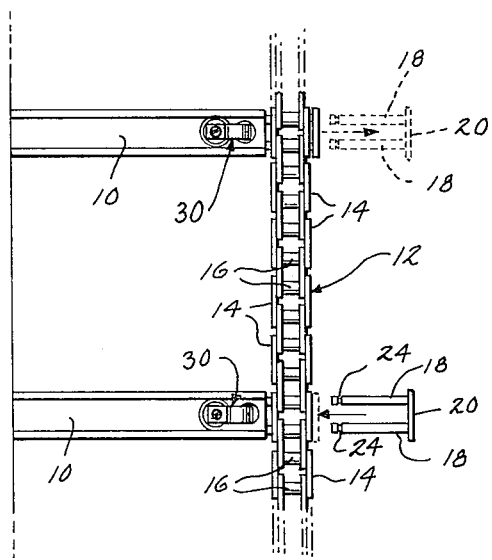
FIG. 1 is a fragmentary plan view of a conveyor showing two conveyor flights connected in spaced apart relationship to a conveyor chain.
Figure 7:
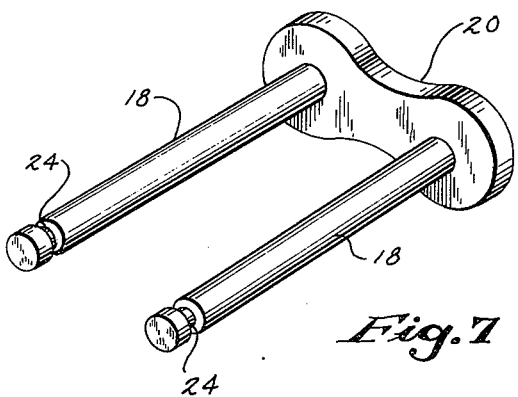
FIG. 7 is a perspective view of the connecting pins and connecting link used in the embodiment of FIGS. 1–6.

FIG. 1 is a plan view of one embodiment of the invention used to mount a plurality of flights 10 on a stretch of standard roller link conveyor chain 12, the latter including links 14 and hollow transverse sleeves 16. Flights 10 and conveyor chain 12 are parts of a conveyor system for pushing items which are to be packaged along a stationary conveyor surface over which the flights 12 travel.

Each of the conveyor links 14 has openings that communicate with the interior of transverse sleeves 16. A pair of connecting pins 18, which are attached in spaced apart parallel relationship to a connecting link 20, is passed through a selected pair of adjacent sleeves 16 and project therebeyond into matching parallel bores 22 (FIG. 2) in the end of a flight 10. Each of the pins 18 is grooved near its end as at 24 to receive a quick-disconnect latch described hereinafter which can be easily released to allow connecting pins 18 to be withdrawn from flights 20 and sleeves 16, as shown in FIG. 1, and shifted to any other desired pair of sleeves 16 along conveyor chain 12. It will be obvious that pins 18 are spaced apart on link 20 by the same distance as that between adjacent sleeves 16 on conveyor chain 20.

Figure 2:
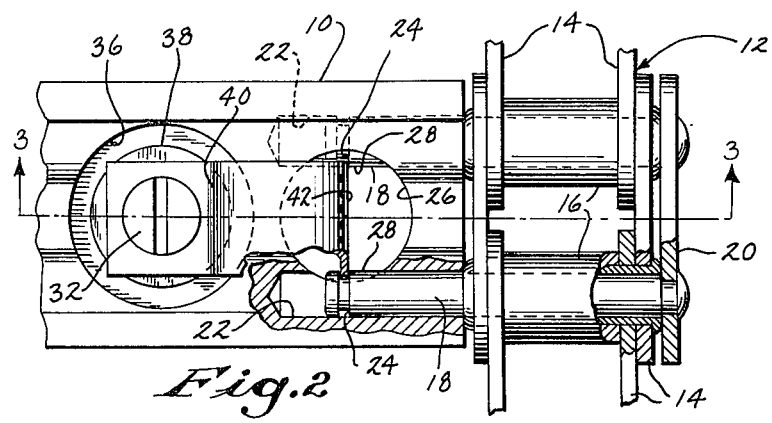
FIG. 2 is an enlarged fragmentary plan view showing the mounting means for one of the flights disclosed in FIG. 1, parts being cut away to reveal inner details.
Figure 3:
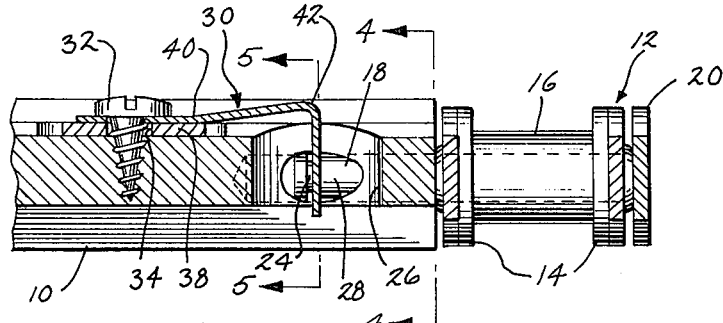
FIG. 3 is a longitudinal sectional view taken on the line 3—3 of FIG. 2.

As shown in FIGS. 2 and 3, a relatively large opening 26 is formed near the end of flight 10, between and transverse with respect to the connecting pin bores 22. Opening 26 intersects portions of connecting pin bores 22 and exposes the inner end portions 28 of connecting pins 18 together with the grooves 24.

An L-shaped latch member 30 is preferably made of yieldable material such as spring steel and is attached to the end of flight 10 by a screw 32 which passes through an opening 34 (FIG. 3) in the end of latch member 30. Flight 10 is recessed at 36 (FIG. 2) to receive latch member 30 and a washer 38 therebeneath.

Latch member 30 is bent slightly upwardly at 40 (FIG. 3) to provide a depressable portion, and the latch member is bent sharply downwardly at 42 to project into the opening 26.

Figure 5:
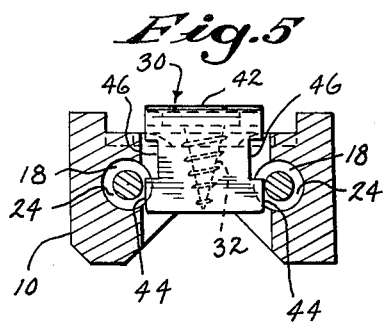
FIG. 5 is a cross sectional view taken on the line 5—5 of FIG. 3, with the latch member in latching position.
Figure 6:
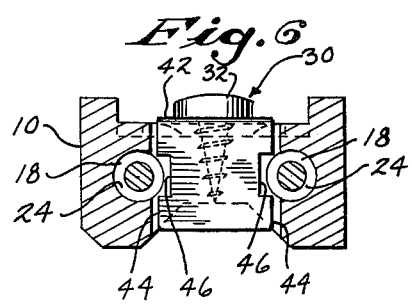
FIG. 6 is a cross sectional view similar to FIG. 5 with the latch member in its unlatched position.
Figure 4:
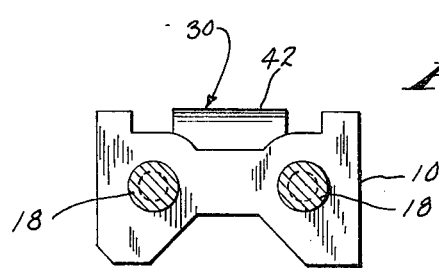
FIG. 4 is a cross sectional view taken on the line 4—4 of FIG. 3.

When latch member 30 is in its normal position, shown in FIGS. 3 and 5, the lower portions 44 of opposed side edges (FIG. 5) of latch 30 engage the grooves 24 in connecting pins 18 and latch flight 10 thereto. The opposite sides of latch member 30 are provided with recesses 46 (FIGS. 5 and 6) which are above the lower groove-engaging portions 44, and said recesses 46 are positioned so as to be movably into alignment with the pins, as shown in FIG. 6, when latch member 30 is manually depressed, the lower groove-engaging side portions 44 being pushed to positions below the pins so that the pins 18 can slide through the recesses 46. The recesses 46 are long enough and deep enough to permit connecting pins 18 to move freely when the latch is depressed as shown in FIG. 6. In the latched position (FIG. 5) of latch member 30, the recesses 46 are above connecting pins 18 so that the lower portions 44 engage in grooves 24 and secure flight 10 to the pins 18 and conveyor chain 12.

To initially connect flights 10 to conveyor chain 12, the connecting pins 18 are passed through adjacent conveyor chain sleeves 16 at the desired connection location and flights 10 are then moved into position to receive the grooved ends of pins 18 in the bores 22, the flights 10 then being pushed toward the chain until the lower portions 44 of latch member 30 snap into grooves 24. If desired, latch member 30 may be depressed to expedite the entry of the pins and then be released to engage the grooves 24 and latch flights 10 to connecting pins 18.

To remove flight 10, latch member 30 is depressed to align recesses 46 with pins 18, and flight 10 is withdrawn from connecting pins 18, which are then withdrawn from sleeves 16 as shown in FIG. 1. To relocate flight 10, the initial placement step is repeated at the new location. Thus it is very easy to remove and relocate the flights 10 and the security of the latch is not diminished by repeated relocations. Such relocation is often necessary to readjust the slight spacing to conform to the requirements of different products.

Although the flights 10 of the disclosed embodiment are connected to conveyor chain 12 on one end only, it will be apparent that a similar mounting and latch mechanism could be employed on the other end of each flight to connect flights 10 between a pair of conveyor chains. Also, although two spaced parallel connecting pins 18 are employed in the disclosed embodiment, the quick-disconnect latch mechanism of this invention could also be applied to a mounting arrangement employing only a single mounting pin. These and other modifications of the disclosed structure will be apparent to those skilled in the art, and this invention includes all modifications falling within the scope of the following claims.

What is claimed is:

1. In combination with a conveyor including at least one conveyor chain mounted for movement along a conveyor path, and including at least one conveyor flight extending transversely of said chain and connected thereto, the improvement wherein the means for connecting said flight to said chain includes a pin projecting laterally from said chain, a bore in said flight slideably receiving said pin, and cooperating latch means on said flight removably connecting said flight to said pin, said latch means including a groove on said pin and a manually operable latch element on said flight having a portion positioned for releasable engagement with said groove on said pin, said latch element including a manually operable yieldable portion which is normally positioned in releasable engagement with said groove, there being means in said yieldable portion adjacent to said groove which is movable to a position to permit said flight to be withdrawn from said pin.

2. The combination defined in claim 1 in which the means in the yieldable portion adjacent said groove is a recess, and in which said recess is movable to a position of alignment with said pin to permit said flight to be withdrawn from said pin.

3. The combination defined in claim 1 wherein there are two pins projecting laterally from said chain and two bores in said flight for receiving said pins, and wherein said latching means includes a groove in each of said pins and a manually operable latch element on said flight having means for releasable engagement with both of said grooves simultaneously.

4. The combination defined in claim 3 and further comprising an opening in said flight extending transversely of and intersecting said two bores to expose inner portions of said pins, said grooves being on the exposed portions of said pins, and said latch element being positioned within said opening and having opposing side edge portions which are releasably engaged with said grooves.

5. The combination defined in claim 4 wherein said opposing side edge portions of said latch element are recessed, with said recesses dimensioned and positioned to be movable into alignment with said pins to enable said pins to be easily withdrawn from said bores in said flight.

6. The combination defined in claim 5 wherein said latch member is L-shaped and made of yieldable material, with one portion projecting into said opening and another portion positioned on top of said flight and attached thereto beyond the margin of said opening in the flight.

7. The combination defined in claim 6 wherein the portion of said latch member which is on top of the flight is bent upwardly away from said flight to provide for yielding movement of the latch member in response to manual pressure.

8. In combination with a conveyor including at least one conveyor chain mounted for movement along a conveyor path, and including at least one conveyor flight extending transversely of said chain and connected thereto, the improvement wherein the means for connecting said flight to said chain includes two pins projecting laterally from said chain, two bores in said flight slideably receiving said pins, latching means on each pin, and a single manually operable latch element on said flight having means for releasable engagement with the latching means of both pins simultaneously.

9. In combination with a conveyor including at least one conveyor chain mounted for movement along a conveyor path, and including at least one conveyor flight extending transversely of said chain and connected thereto, the improvement wherein the means for connecting said flight to said chain includes a pin projecting laterally from said chain, a bore in said flight slideably receiving said pin as a result of pushing movement longitudinally only of said flight, and means including cooperating latch means on said flight and pin, one of which is yielding, removably connecting said flight to said pin when the latter has been fully inserted in said bore by said longitudinal pushing movement.

* * * * *